United States Patent

[11] 3,576,352

[72] Inventors Tadao Sato
 Fujisawa-shi, Kanagawa-ken;
 Yutaka Masaoka, Shizuoka-ken, Japan
[21] Appl. No. 811,442
[22] Filed Mar. 28, 1969
[45] Patented Apr. 27, 1971
[73] Assignees Yamaha Hatsudoki Kabushiki Kaisha
 Hamakita-shi, Shizuoka-ken, Japan and
 Yokohama Rubber Co., Ltd.
 Tokyo, Japan
[32] Priority Mar. 30, 1968
[33] Japan
[31] 43/25109

[54] ENDLESS BELT TRACTION VEHICLE
 9 Claims, 4 Drawing Figs.
[52] U.S. Cl................................................. 305/35,
 74/243, 180/5
[51] Int. Cl................................................. B62d 55/12
[50] Field of Search........................................ 305/35
 (EB); 152/176, 323, 52, 357; 74/243

[56] References Cited
UNITED STATES PATENTS

| | | | |
|---|---|---|---|
| 1,292,345 | 1/1919 | Martin.......................... | 152/52 |
| 1,396,984 | 11/1921 | Willis............................ | 152/47 |
| 3,208,500 | 9/1965 | Knipp........................... | 152/357X |
| 3,236,568 | 2/1966 | Bombardier................. | 180/5X |
| 3,261,646 | 7/1966 | Pax............................... | 305/35 |
| 3,300,835 | 1/1967 | Barr.............................. | 74/243X |
| 3,362,492 | 1/1968 | Hansen......................... | 180/5 |

Primary Examiner—Richard J. Johnson
Attorney—George B. Oujevolk

ABSTRACT: At least one of sprocket wheels provided in an endless-belt traction vehicle involves an outer ring of wear-resistant plastics material, and an inner ring of natural or synthetic elastomeric resin having an axial bore into which is securely inserted an axle carried on the vehicle body. Said sprocket wheel is attached to the axle by means of fixing members with its flexibility preserved with respect to the axle.

INVENTOR.

ENDLESS BELT TRACTION VEHICLE

BACKGROUND OF THE INVENTION

This invention relates to an endless-belt traction vehicle, and more particularly to an endless-belt traction vehicle having sprocket wheels which can absorb impacts transmitted from the ground.

It has been known that the sprocket wheel of the prior art endless-belt traction vehicle comprises a metal wheel having a rim and an axial bore into which an axle is securely inserted, an annular body of fabric-reinforced rubber having sprocket teeth, and means for rigidly fitting said body with said rim. Although the flexibility of the annular body protects said sprocket wheel from being broken at the teeth by impact with hard objects protruding from the ground, it has been impossible sufficiently to absorb the impact so as to prevent the axle and frame from being damaged.

SUMMARY OF THE INVENTION

An object of this invention is to provide an endless-belt traction vehicle having at least one improved sprocket wheel fixed to the axle with its flexibility preserved with respect to the axle.

Therefore, the endless-belt traction vehicle of this invention comprising at least one endless track belt having openings serially arranged along the length thereof, more than two sprocket wheels interlocked with said openings, any one of which can drive said endless track belt, axles fitting in with the axial bores of said sprocket wheels respectively, and means for fixing the sprocket wheels to the axles, is characterized in that at least one of said sprocket wheels involves an outer ring of wear resistant plastics material having a sufficiently great rigidity to endure loads applied when the endless track belt is driven, and an inner ring of natural or synthetic elastomeric resin having a sufficient flexibility to absorb impacts applied thereto in a substantially radial direction, thereby allowing the inner peripheral surface of the sprocket wheel to be always pressed to the outer peripheral surface of the axle and is attached to the axle by said fixing means with its flexibility preserved with respect to the axle.

Under such arrangement, impacts applied to the sprocket wheel are damped and broadly distributed over that area of the surface of the axle defined by the width of the sprocket wheel, so that the axle can sufficiently withstand the impact, even if it consists of a thin hollow cylinder.

DETAILED DESCRIPTION OF THE PREFERRED EMBODIMENTS

Figure 1:
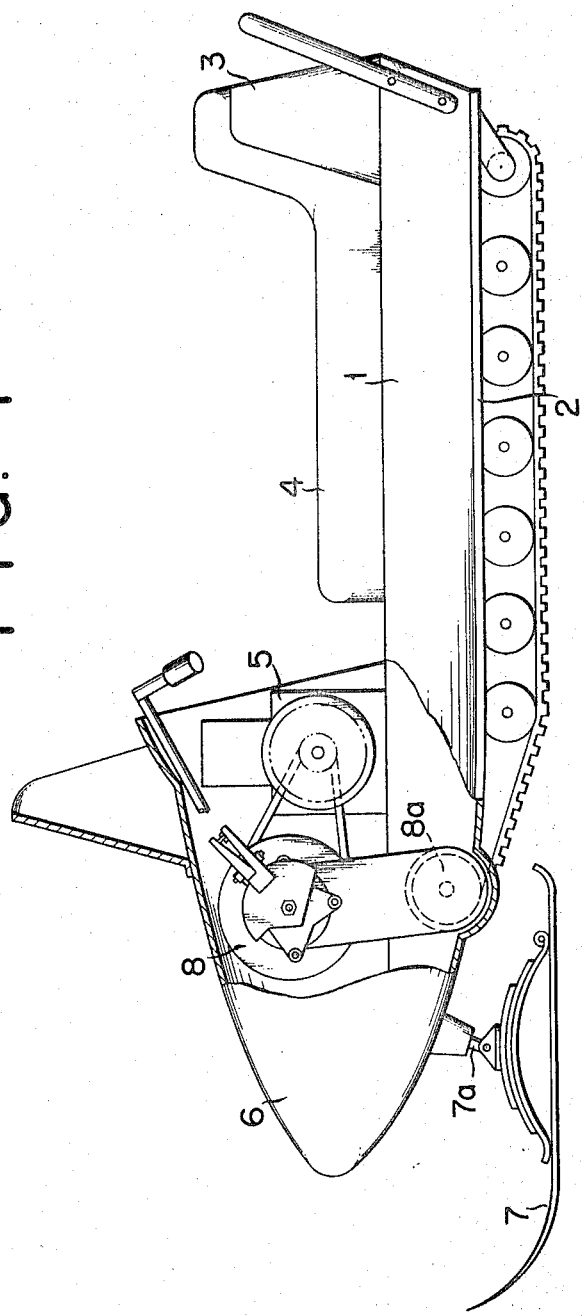
FIG. 1 is a side view of an endless-belt traction vehicle embodying this invention, partly broken away.
Figure 2:
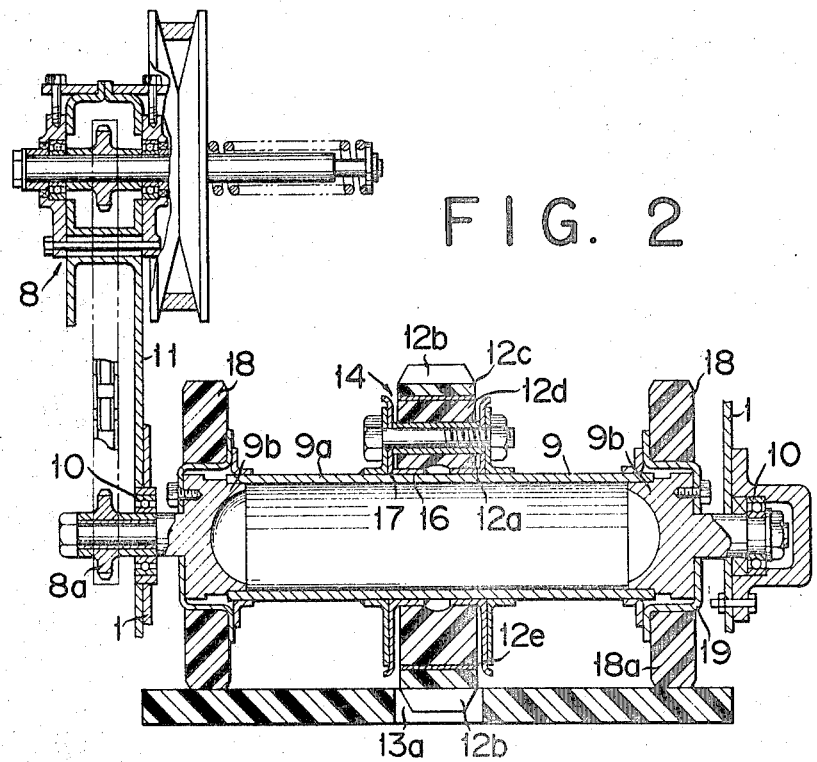
FIG. 2 is a cross-sectional view of an endless-belt traction means of said vehicle.
Figure 3:
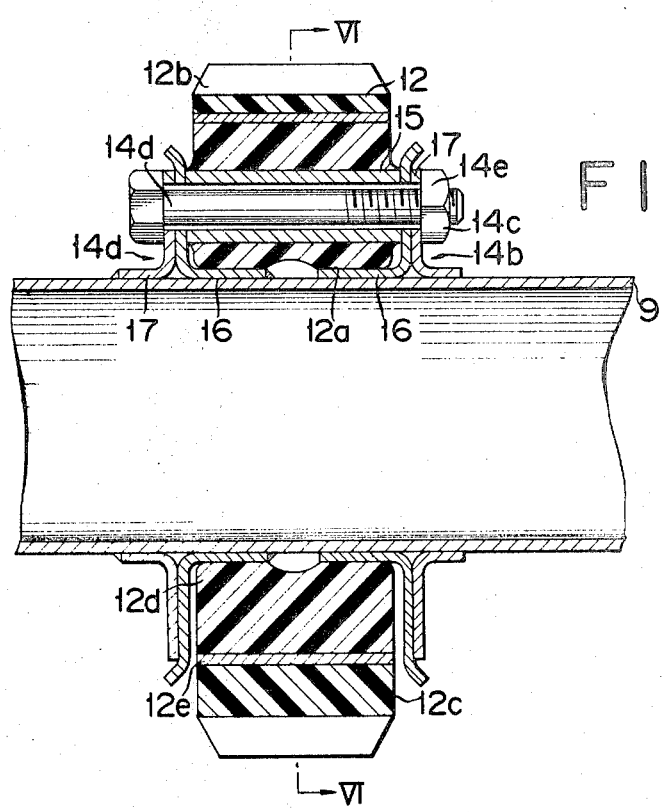
FIG. 3 is an enlarged cross-sectional view of the main part of this invention.
Figure 4:
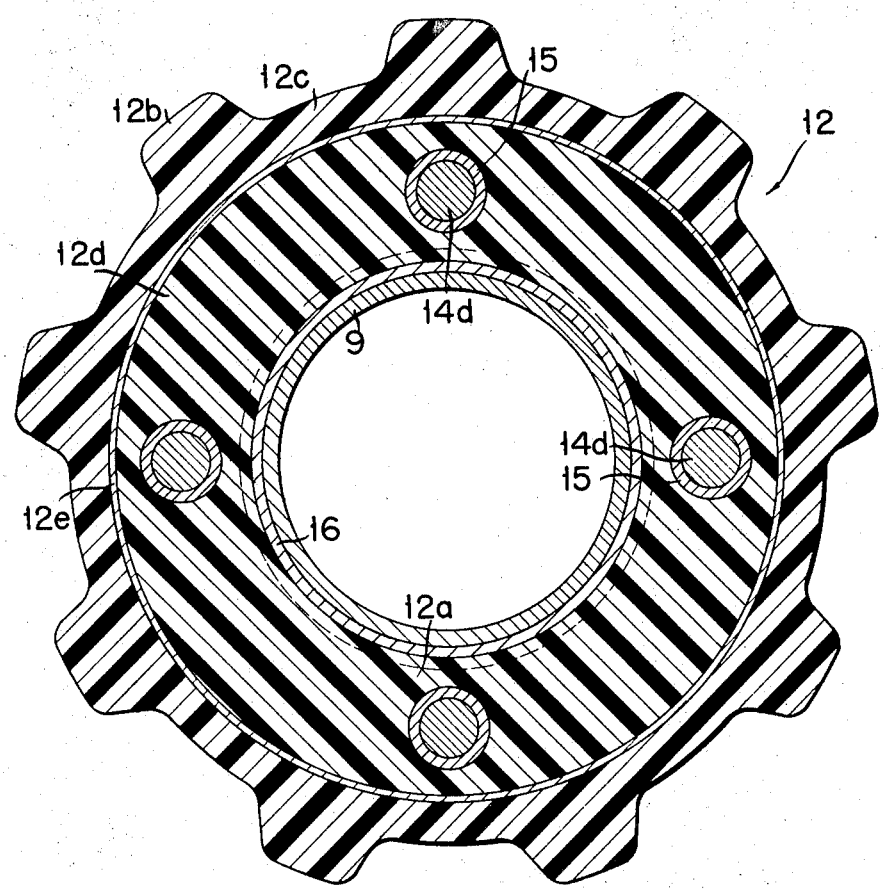
FIG. 4 is a cross-sectional view of the main part taken along a line IV–IV of FIG. 3.

FIG. 1 illustrates the whole of an endless-belt traction vehicle embodying this invention which is mainly used on the snow. Said vehicle has an inverted channel-shaped frame 1 which is provided with a pair of sheath-shaped steps 2 formed at the sides thereof. On the rear portion of said frame 1 is disposed a fuel tank 3. A long seat 4 is positioned on the frame 1 with its rear end covering the fuel tank 3. An engine 5 is located at the front end portion of the frame 1 and shielded by a conical cover 6 attached to the front end portion of the frame 1. A pair of skis 7 are positioned under the front end of the frame 1 in a manner to be supported by their legs 7a extending from the front bottom of the frame 1. A transmission device 8 is almost covered by said conical cover 6 and disposed on the frame 1 in association with said engine 5. A final transmitting sprocket wheel 8a of said transmission device is secured to a driving axle 9 rotatably carried on bearings 10 attached to the sidewall of the frame 1 and a chain housing 11. Said driving axle 9 preferably consists of a hollow cylinder 9a and two necked pieces 9b fitting in with the end portions of said cylinder 9a respectively. The free ends of said necked pieces 9b are rotatably inserted into the bearings 10 respectively.

A sprocket wheel 12 has an axial bore 12a and sprocket teeth 12b, and is positioned at the middle portion of axle 9 securely inserted into said bore 12a. An endless track belt 13 of rubber or the like material has openings 13a which are serially arranged in a row along the length of said belt 13 and are interlocked with said teeth 12b.

Said sprocket wheel 12 involves an outer ring 12c having the sprocket teeth 12b formed on the periphery thereof, an inner ring 12d having the axial bore 12a penetrating through the center thereof, and a metal-strip ring 12e interposed between the outer and inner rings 12c and 12d. Said outer ring 12c is wholly made of wear-resistant plastics material having a sufficiently great rigidity to endure loads applied when the endless track belt 13 is driven. In this embodiment, said outer ring 12c is preferably made of rigid resin having full ice repellence and wear resistance, and furthermore of polyurethane having a hardness of 95°±3° as measured by durometer. Said inner ring 12d is wholly made of natural or synthetic elastomeric resin having a sufficient flexibility to absorb impacts applied thereto in a substantially radial direction, thereby allowing the inner peripheral surface of said bore 12a to be always pressed to the outer surface of the axle 9. In this embodiment, said inner ring 12d is preferably made of soft rubber having a hardness of 70°±5° as measured by a durometer.

Said metal-strip ring 12e is preferably formed in an integral block together with said outer and inner rings 12c and 12d. Consequently, the metal ring 12e acts as a means for joining the outer and inner rings 12c and 12d, particularly where the outer ring is made of polyurethane and the inner ring of rubber, because the metal has adhesivity to the polyurethane and rubber though they can hardly be bonded together. Where the outer ring 12c is made of polyolefin resins such as polyethylene, the metal ring 12e is preferably provided, due to its lack of adhesivity thereto, with a plurality of protrusions formed on its outer periphery so as mechanically to engage with said outer ring.

As a result, the sprocket wheel 12 is constructed in the best form for utilizing the quality of materials involved by causing the outer ring 12c to share loads applied when the endless track belt 13 is driven, and the inner ring 12d to share impacts applied to the sprocket wheel.

Said sprocket wheel 12 is attached to the axle 9 by fixing means involving coupling members 14. Each of said coupling members 14 consists of a stationary mounting member 14a fixedly secured to the axle 9 at one side of the sprocket wheel 12, an adjustable mounting member 14b removably secured to the axle 9 at the other side of the sprocket wheel 12 and four bolt-nut assemblies 14c. Further, the sprocket wheel 12 is provided with four hollow cylindrical spacers 15 fitted in the inner ring in a manner to extend from side to side thereof and to be spatially disposed along the circular line defined around the center thereof. A bolt 14d of each of the bolt-nut assemblies 14c extends through the spacer 15 and bridges both mounting members 14a and 14b.

Accordingly, the spacer 15 is clamped between both mounting members 14a and 14b by progressively screwing the nut 14e of each of the bolt-nut assemblies 14c to its bolt 14d so that said sprocket wheel 12 is rigidly secured to the axle 9 merely by said clamping. In this case, the sprocket wheel will preserve a sufficient flexibility to absorb impacts through the wall thickness thereof so as to prevent the axle 9 and frame 10 from being damaged.

Furthermore, since impacts applied to the sprocket wheel 12 are broadly distributed over that area of the surface of the axle 9 defined by the width of the sprocket wheel 12, i.e. the inner surface of the axial bore 12a, the axle 9 can sufficiently withstand the impact, even if it consists of a thin-wall hollow cylinder as illustrated in the drawings.

In order to reinforce the axle 9 and more particularly the portion of the axle 9 facing the inner surface of the axial bore 12a, each mounting member preferably consists of a pair of cylindrical members 16 with flanges 17 mutually welded back to back. One of said cylindrical members 16 is inserted with a close fit between the inner surface of the bore 12a and the outer surface of the axle 9.

In this embodiment, driven sprocket wheels, though not illustrated, are the same composition as the driving sprocket wheel 12, therefore its detailed explanation is eliminated for avoiding the complication. In contrast, either one of the driving and driven sprocket wheels may be the same composition as the above-mentioned wheel 12.

The endless track belt 13 is supported at its edge portions by means of couples of guide wheels 18, each couple of the guide wheels 18 being fixedly secured to the corresponding driving and driven axles, each of which carries the aforesaid driving or driven sprocket wheel. One of said guide wheels 18 preferably consists of an annular body 18a of natural or synthetic elastomeric resin, for example, rubber and a cylindrical rim 19. Said guide wheels 18 are attached to the ends of the axle by means of bolt setting the rim 19 to the axle 9.

In the arrangement of this invention, the endless-belt traction vehicle may be provided with two endless track belts, of course with each of them fitted with the corresponding equipment such as a driving sprocket wheel, driven sprocket wheel or wheels, guide wheels, and driving and driven axles.

We claim:

1. An endless-belt traction vehicle comprising at least one endless track belt having openings serially arranged along the length thereof, more than two sprocket wheels interlocked with said openings, any one of which can drive said endless track belt, axles fitting in with the axial bores of said sprocket wheels respectively, and means for fixing the sprocket wheels to the axles, wherein at least one of said sprocket wheels involves a polyurethane resin outer ring of wear-resistant plastics material having a sufficiently great rigidity to endure loads applied when the endless track belt is driven, and an inner ring of natural or synthetic elastomeric rubber having a sufficient flexibility to absorb impacts applied thereto in a substantially radial direction, and a metal ring is interposed between said outer and inner rings, thereby allowing the inner peripheral surface of the sprocket wheel to be always pressed to the outer peripheral surface of the axle and is attached to the axle by said fixing means with its flexibility preserved with respect to the axle.

2. An endless-belt traction vehicle claimed in claim 1 in which said metal ring is formed in an integral block together with said outer and inner rings.

3. An endless-belt traction vehicle claimed in claim 1 in which said inner ring is provided with fitted spacers disposed therein in a manner to extend from side to side of the sprocket wheel and to be spatially disposed along a circular line defined around the center thereof, and said fixing means comprises coupling members adapted to clamp each of said spacers therebetween, said coupling members being fixedly secured to the axle.

4. An endless-belt traction vehicle claimed in claim 3 in which said spacers are respectively formed into a hollow cylinder, and each of said coupling members consists of a stationary mounting member fixedly secured to the axle at one side of the sprocket wheel, an adjustable mounting member removably secured to the axle at the other side of the sprocket wheel and bolt-nut assemblies, the bolt of each of which extends through the spacer and bridges both mounting members.

5. An endless-belt traction vehicle claimed in claim 4 in which each of the mounting members has a hollow cylindrical flange fitting in with the axle, part of said flange being so inserted between the inner surface of the sprocket and the outer surface of the axle as to reinforce the axle against loads or impacts applied through the sprocket wheel.

6. In an endless belt traction vehicle having at least one endless track belt having openings serially arranged along the length thereof, more than two sprocket wheels interlocked with said openings, any one of which can drive said endless track belt, axles fitting in with the axial bores of said sprocket wheels respectively, and fixing means for fixing the sprocket wheels to the axles, the improvement therein wherein at least one of said sprocket wheels has an outer ring of wear-resistant plastic material having a sufficiently great rigidity to endure loads applied when the endless track belt is driven, an inner ring of substantially softer resilient material than said outer ring and formed of natural or synthetic elastomeric resin having a sufficient flexibility to absorb impacts applied thereto in a substantially radial direction, thereby allowing the inner peripheral surface of the sprocket wheel to always be pressed to the outer peripheral surface of the axle and is attached to the axle by said fixing means with its flexibility preserved with respect to the axle, an annular metal ring separating said inner and outer rings and spacers penetrating the inner ring of the sprocket wheel in a manner to project from both sides thereof and spacially disposed along a circular line defined around the center thereof, and, said fixing means comprises coupling members adapted to clamp each of said spacers therebetween and fixedly secured to the axle.

7. An endless belt traction vehicle claimed in claim 6, in which said metal ring is formed in an integral block together with said outer and inner rings.

8. An endless-belt traction vehicle claimed in claim 6, in which said spacers are respectively formed into a hollow cylinder, and each of said coupling members consists of a stationary mounting member fixedly secured to the axle at one side of the sprocket wheel, an adjustable mounting member removably secured to the axle at the other side of the sprocket wheel and bolt-nut assemblies, the bolt of each of which extends through the spacer and bridges both mounting members.

9. An endless-belt traction vehicle claimed in claim 6, in which each of the mounting members has a hollow cylindrical flange fitting in with the axle, part of said flange being so inserted between the inner surface of the sprocket and outer surface of the axle as to reinforce the axle against loads or impacts applied through the sprocket wheel.